United States Patent [19]

Lent et al.

[11] Patent Number: 4,756,758

[45] Date of Patent: Jul. 12, 1988

[54] THERMOCHROMIC JET INK

[75] Inventors: Bruce A. Lent, Oak Park; Paul N. Elue, Chicago, both of Ill.

[73] Assignee: Videojet Systems International, Inc., Elk Grove Village, Ill.

[21] Appl. No.: 42,175

[22] Filed: Apr. 24, 1987

[51] Int. Cl.$^4$ ............................................. C09D 11/00
[52] U.S. Cl. ..................................... 106/22; 106/20; 252/408.1
[58] Field of Search ............................ 106/20, 21, 22; 252/408.1; 427/148, 150; 503/218

[56] References Cited

U.S. PATENT DOCUMENTS

| | | | |
|---|---|---|---|
| 3,471,422 | 10/1969 | Edlein et al. | 260/22 |
| 4,028,118 | 6/1977 | Nakasuji et al. | 106/21 |
| 4,155,895 | 5/1979 | Rohowetz et al. | 260/33.4 R |
| 4,166,044 | 8/1979 | Germonprez et al. | 252/408 |
| 4,179,397 | 12/1979 | Rohowetz et al. | 252/408 |
| 4,228,761 | 10/1980 | Glover et al. | 116/201 |
| 4,424,990 | 1/1984 | White et al. | 285/381 |
| 4,450,023 | 5/1984 | De Blauwe | 156/64 |

FOREIGN PATENT DOCUMENTS 0042285 12/1981 European Pat. Off. .

*Primary Examiner*—Amelia Burgess Yarbrough
*Assistant Examiner*—Christine Skane
*Attorney, Agent, or Firm*—Leydig, Voit & Mayer

[57] ABSTRACT

The thermochromic jet ink compositions of the present invention undergo color changes in response to changes in thermal environment. Additionally, the inks comprise a combination of solvent, dyes and other essential ingredients which make them suitable for ink jet printing, or printing which is effected without contact between the printing device and the substrate on which the printed characters are deposited. The present invention provides thermochromic ink compositions with enhanced thermal specificity. Moreover, these inks are capable of indicating that the substrate has been exposed to such a specific thermal environment for at least a specified minimal period of time. The color change so effected is irreversible and does not require steam or moisture to leach out selected components of the composition thereby providing a more rapid and distinct color change. The most notable use of the present invention is to indicate completion of pasteurization or sterilization of the substrate or its contents.

10 Claims, No Drawings

THERMOCHROMIC JET INK

BACKGROUND OF THE INVENTION

The invention of this application relates to ink jet printing compositions and their use as color change indicators. The compositions are particularly useful as sterilization and/or thermal exposure indicators.

Ink jet printing is a well known technique by which printing is effected without contact between the printing device and the substrate on which the printed characters are deposited. Briefly described, ink jet printing involves the technique of projecting a stream of droplets of ink to a surface and controlling the direction of the stream electronically so that the droplets are caused to form the desired printed image on the substrate. That technique of non-contact printing is particularly well suited for application of characters onto irregularly shaped surfaces, including, for example, the bottom of beverage containers.

In general, ink jet printing techniques impose rigid requirements on the ink compositions. To be suitable for use as a jet ink, the compositions must meet rigid requirements of viscosity and resistivity, solubility, compatibility of components and wettability of substrate; the ink must be quick-drying and smear resistant, must be capable of passing through the ink jet nozzle without clogging and must permit rapid clean-up of the machine components with minimum effort.

Apart from the jet ink applications of the ink, another area of interest in the art is the provision of printable pasteurization or sterilization indicators. Such compositions have heretofore usually utilized pigments and pigment combinations and have been applied primarily in determining whether proper sterilization heat has been applied to objects used in medical and surgical procedures. In the food packaging industry, for example, where metal cans, plastic pouches or coated metal cans are printed, filled with product, sealed and the package subjected to conditions of high temperature and moisture during pasteurization or sterilization techniques, there is a need for such compositions that are printable by either contact or jet ink techniques, that exhibit sufficient adhesion to the substrate to withstand the moisture and high temperature conditions of sterilization and which, at the same time, undergo a visible and permanent color change.

The provision of such an ink composition which shows a distinct difference in color between an unsterilized and a completely sterilized package provides for ready visible inspection and permits tracing a particular package or packages after they have been processed. The invention thus provides a positive and visible indication that sterilization or pasteurization has in fact been carried out on the product to which the ink is applied.

Thermochromic inks and paints have been known for some time.

U.S. Pat. No. 3,471,422 describes a temperature responsive printing ink which is responsive to autoclaving. This ink is based on a pigment which initially is of one given color and which upon exposure to the elevated temperature condition reacts with a sulfur generated by a second component of the ink to generate a second color.

U.S. Pat. No. 4,166,044 describes a temperature responsive jet printing ink useful as a sterilization or pasteurization indicator. This ink comprises either (1) a colorant which reacts under the elevated temperature conditions to change its color, or (2) a combination of colorants which together form an initial given color and under steam sterilization conditions changes color due to leeching.

Similarly, U.S. Pat. No. 4,179,397 discloses an extractable/nonextractable dye combination for thermotropic ink compositions which meet the rigid requirements for ink jet printing techniques. Finally, U.S. Pat. No. 4,155,895 performs similarly to the thermotropic ink described in U.S. Pat. No. 4,179,397 but that rather than relying on the leeching out of a more soluble dye at elevated temperature in the presence of steam or water the '895 patent utilizes a thermochromic dye that reacts at elevated temperature in the presence of steam to undergo a visible color change.

These prior art inks show a color change upon exposure to a temperature level/time period either because (1) there is a change in the molecular structure of the color component and the new molecule displays a different color, or (2) a color component is selectively extracted to enable the ink to show as a new color.

It is, therefore, a principal object of the present invention to develop an ink which indicates by a color change that it was exposed to an environment having a temperature in excess of a predetermined level for at least a specified minimal period of time. It is an additional object of the present invention to exploit the inherently more temperature specific process of chemical degradation in this case, of heat-sensitive dyes, to show more precisely and dramatically the exposure of an article printed with an indicator ink to a predetermined temperature level/time period. Another object of the present invention is to make a jet printable ink that could display a desired message having a predetermined color on a container or package in response to a specific temperature level/time period.

These and other objects of the invention will be apparent from the description which follows.

SUMMARY OF THE INVENTION

The foregoing objects are accomplished by providing an improved thermochromic ink composition particularly adapted for use as a jet ink composition which utilizes a unique combination of dyes. More specifically, a dye with a desired heat sensitivity is combined with a heat resistant dye and a suitable organic carrier to form an ink. Upon exposure to the prescribed temperature for a predetermined length of time the heat sensitive dye will degrade and the color of the ink will change to that of the heat resistant dye. Preferably the color of the message printed with the ink composition of this invention should change color when exposed to an elevated temperature such as a temperature at or above about 116° C. particularly a temperature from about 116° C. to about 127° C. for a period of time, such as for a time of about 15 minutes to about 30 minutes. The advantage of the described ink lies in the fact that there is more precise control of the temperature of conversion and resulting dramatic color change which occurs upon exposure of the ink of the invention to the predetermined temperature/time conditions. The temperature control is possible by taking advantage of the greater temperature dependence of chemical decomposition over that of aqueous extraction, and the color change is accomplished by use of a stable dye which exhibits a vividly different color from the combination of heat sensitive/heat stable dyes. Thus, a definitive color change occurs after exposure to predetermined temperature conditions. Further, because chemical decomposition takes place the color change is irreversible.

DETAILED DESCRIPTION OF THE INVENTION

As described hereinabove, the ink compositions of this invention comprise a thermally degradable/nondegradable combination of dyes, a suitable carrier, a resin, and other optional components each of which should be in carefully balanced proportion to achieve successful operation of the ink in a jet printing apparatus and suitable properties as color-change indicators.

In general, the inks of the present invention exhibit the following characteristics for use in ink jet printing systems: (1) a viscosity from about 1.6 to about 7.0 centipoises at 25° C., (2) an electrical resistivity from about 50 to about 2000 ohm/cm., and (3) a sonic velocity from about 1200 to about 1300 meters/sec. Electrolytes can be added to adjust the specific resistivity of the ink. Usable electrolytes include dimethylamine hydrochloride and hydroxylamine hydrochloride.

The inks should dry quickly, within about 4 seconds, with good adhesion when printed on bare tinplate or aluminum or on polymeric coated tin or aluminum cans. It will be understood by those familiar with the art that these inks will exhibit a color change in a temperature/time dependant manner. That is, as the temperature is increased, the time period required to bring about a color change will decrease. Similarly, a longer period of exposure of the ink to sterilization conditions will facilitate a color change at a relatively lower temperature. The inks should exhibit a visible color change when exposed to a temperature at or above 116° C. for a length of time of 15 minutes or more. Most preferably the color change will occur upon exposure to a temperature of about 116° C. for about 15 minutes.

Suitable heat-sensitive dyes for use in the inks of this invention are those which undergo decomposition and hence a visible and permanent color change when exposed to the desired temperature, such as temperatures above 116° C. In addition to such thermochromic characteristics the dye must also be soluble in the ink solvent system and compatible with components thereof.

Preferred heat-sensitive dyes are typically selected from such dyes as solvent based dyes and basic dyes. One skilled in the art will be able to ascertain other such operable dyes through reference to information as contained in the *Color Index Guide*.

Exemplary of such dyes are those available and known in the art as Basic Green 4, commercially available as Victoria Green from Keystone Aniline Corp., and Solvent Yellow 56, commercially available as Sudan Yellow 150, from BASF Wyandotte Corp.

It is contemplated that other dyes not specifically enumerated, but of sufficient compatibility and solubility, and reactive under the described conditions to undergo decomposition and loss of colorant effect, may also be employed.

In general these heat-sensitive dyes are present in the composition in amounts varying from about 0.5% to about 2.5% by weight of the composition.

Suitable heat stable dyes for use in this invention are those which are unresponsive to wide variations in temperature, are selected so as to be visually distinct from the heat-sensitive dye, are soluble in the chosen liquid carrier, and are compatible with other components of the system.

A preferred class of heat-resistant dyes are those which may be classified as solvent based dyes having a high temperature of degradation, such as at least about 150° C.

Exemplary of such dyes are those available and known in the art as Solvent Red 33, Basic Violet 4, Solvent Blue 98, and Solvent Red 164. These dyes are commercially available by their trade names; Luxol Fast Red B (Morton Thiokol, [M.T.]), Ethyl Violet (Keystone Aniline Corp.), Automate Blue #8 (M.T.), and Automate Red 164 (M.T.), respectively.

It is contemplated that other heat-stable dyes not enumerated but of sufficient compatibility, solubility and colorant effect may also be employed.

In general these heat-stable dyes are present in the composition in amounts varying from about 1.0% to about 4.0% based on the weight of the ink composition.

Although a variety of solvents may be utilized as the liquid carrier system, the principal combination is typically that of a lower aliphatic alcohol and a lower aliphatic branched ketone. Preferred is the combination of methanol and methyl ethyl ketone.

Suitable resins for use in this invention include those which are of the class of phenolic type resins. One such commercially available resin is Varcum 8357 from BTL Specialty Resins Corp.

Surfactants may also be added to impart desirable characteristics to the liquid ink composition. Suitable surfactants include nonionic surfactants such as fluorinated alkyl esters (i.e. commercially available as FC-170C from 3M Co.).

Other optional components may be included in the inks of the present invention, such as plasticizers. One such suitable plasticizer is that commercially available from Monsanto as Saniticizer 8. It also may be desirable to add humectants, to prevent the jet tip from drying, such as propylene glycol methyl ether.

The following examples are illustrative of ink compositions according to this invention which are effective thermochromic jet inks.

EXAMPLE 1

The following composition was formulated:

| | |
|---|---|
| Methyl Ethyl Ketone | 29.9% |
| Methanol | 39.0% |
| Varcum 8357 | 13.0% |
| Dimethylamine hydrochloride | 0.6% |
| FC-170C (surfactant) | 1.5% |
| Saniticizer 8 (plasticizer) | 2.0% |
| Basic Green 4 (unstable) | 2.4% |
| Luxol Fast Red B (stable) | 3.6% |
| Propylene glycol methyl ether | 8.0% |
| | 100.0% |

The resulting ink had a viscosity of 1.86 cps, a resistivity of 460 ohm/cm, and a sonic velocity of 1260 meters/second.

The ink was jet printed on bare tinplate and aluminum, and coated tin and aluminum cans. The ink quickly dried to a black image within four seconds and had good adhesion. The labelled articles were subjected to conditions of retorting, sterilizing, pasteurizing, or autoclaving at 116° C. for 20 minutes. In response to these conditions the printed indicia visibly changed color from black to red.

EXAMPLE 2

Replacing Luxol Fast Red B in Example 1 with Solvent Red 33, all other factors and ingredients being identical the same results were observed with the minor exception being that the initial ink composition exhibited a blackish-green color which then became red under the above described conditions.

EXAMPLE 3

Replacing the Basic Green 4 and Luxol Fast Red B of Example 1 with Solvent Yellow 56 and Basic Violet 4, respectively, all other factors and indredients being identical resulted in a color change of black to blue/violet under the prescribed conditions.

EXAMPLE 4

Replacing the Basic Violet 4 of Example 3 with solvent Blue 98, all other factors and ingredients identical, gave a color change of green to blue under the prescribed conditions.

EXAMPLE 5

Replacing the Solvent Red 33 of Example 2 with Solvent Red 164, all other factors and ingredients being equal, the same adhesion and quick drying characteristics were observed and the black ink changed to red under the prescribed temperature level/time period exposure.

What is claimed is:

1. A thermochromic ink composition suitable for ink jet printing operations comprising a combination of at least one heat-resistant and at least one heat-sensitive dye said heat sensitive dye being capable of undergoing decomposition upon exposure to an elevated temperature for a period of time so that the color of the ink changes to that of the heat-resistant dye.

2. The ink composition of claim 1 wherein the two different dyes have vividly different colors and the heat sensitive dye is present in an amount from about 0.5 to about 2.5 weight percent, and the heat resistant dye is present in an amount from about 1.0 to about 4.0 weight percent, based on the total weight of the composition.

3. The ink composition of claim 1 wherein the ink irreversibly changes color in response to a chosen thermal environment with or without the presence of water or steam.

4. The ink composition of claim 1 in which the heat-sensitive dye is capable of degrading, irreversibly, so that the ink is capable of visually registering a color change upon exposure to about 116° C. for about 15 minutes.

5. The ink composition of claim 4 which has a viscosity from about 1.6 to about 7.0 centipoises at 25° C., an electrical resistivity from about 50 to about 2000 ohm/cm, and a sonic velocity from about 1200 to about 1300 meters/sec.

6. The ink composition of claim 4 which will undergo the said degradative color change when subjected to conditions of retorting, sterilizing, pasteurizing or autoclaving.

7. The ink composition of claim 4 which when jet printed on bare tinplate or on polymeric coated tin or aluminum cans will quickly dry with good adhesion.

8. The composition of claim 4 wherein the heat-resistant dye is selected from the group consisting of Solvent Red 33, Basic Violet 4, Solvent Blue 98, and Solvent Red 164 and the heat-sensitive dye is selected from the group consisting of Basic Green 4 and Solvent Yellow 56.

9. A method of indicating sterilization of an article which comprises applying a marking to the surface of said article utilizing the ink composition of claim 1 and exposing the marked article in a temperature/time dependant manner to an environment having a temperature of from about 116° C. to about 127° C. for a period of time of at least about 15 minutes, such that a visible color change is effected in said markings.

10. The method of claim 9 wherein said markings are applied by jet ink printing of said thermochromic ink composition and the exposure is to a temperature of about 116° C. for about 15 minutes.

* * * * *